US010134370B2

(12) United States Patent
Park et al.

(10) Patent No.: US 10,134,370 B2
(45) Date of Patent: Nov. 20, 2018

(54) SMART MIRROR WITH FOCUS CONTROL

(71) Applicant: Samsung Electronics Co., Ltd., Gyeonggi-do (KR)

(72) Inventors: Ken-Hyung Park, Gyeonggi-do (KR); Tae-Seon Kim, Seoul (KR); Chang-Ryong Heo, Gyeonggi-do (KR); Min-Young Kim, Gyeonggi-do (KR); Tae-Kyun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 14/802,782

(22) Filed: Jul. 17, 2015

(65) Prior Publication Data

US 2016/0019868 A1 Jan. 21, 2016

(30) Foreign Application Priority Data

Jul. 18, 2014 (KR) ........................ 10-2014-0090998

(51) Int. Cl.

| | |
|---|---|
| ***G09G 5/391*** | (2006.01) |
| ***G02B 3/00*** | (2006.01) |
| ***G02B 5/08*** | (2006.01) |
| ***G02F 1/19*** | (2006.01) |
| ***G09G 5/00*** | (2006.01) |
| ***G02B 27/22*** | (2018.01) |

(52) U.S. Cl.

CPC .......... *G09G 5/391* (2013.01); *G02B 3/0006* (2013.01); *G02B 5/08* (2013.01); *G02B 27/2292* (2013.01); *G02F 1/19* (2013.01); *G09G 5/003* (2013.01); *G09G 2354/00* (2013.01)

(58) Field of Classification Search

None

See application file for complete search history.

(56) References Cited

U.S. PATENT DOCUMENTS

| | | | | |
|---|---|---|---|---|
| 5,351,151 | A * | 9/1994 | Levy | G02B 3/0043 359/237 |
| 6,201,517 | B1 * | 3/2001 | Sato | G02B 27/2228 345/51 |
| 6,560,027 | B2 | 5/2003 | Meine | |
| 7,562,985 | B2 * | 7/2009 | Cortenraad | G02B 26/005 345/7 |
| 7,843,404 | B2 | 11/2010 | Lee | |
| 9,430,055 | B2 * | 8/2016 | Westerinen | G06F 3/033 |

(Continued)

OTHER PUBLICATIONS

Extended European Search Report dated Dec. 18, 2015 in connection with European Patent Application No. 15175909.9; 7 pages.

*Primary Examiner* — Jason Pringle-Parker

(57) ABSTRACT

An electronic device includes a display unit configured to display a plurality images, an eye tracking sensor configured to detect a eye-focused area on the display unit, a reflective layer, a reflective control layer configured to change a regional reflectivity of the reflective layer, and a processor configured to receive the eye-focused area on the display unit from the eye tracking sensor, and determine a focus image within the eye-focused area and an unfocused image out of the eye-focused area, and cause the reflective control layer to reflect the unfocused image. In some embodiment, the processor is configured to cause the reflective control layer not to reflect the focused image.

5 Claims, 11 Drawing Sheets

101 111 121 a b

(56) References Cited

U.S. PATENT DOCUMENTS

| | | | | |
|---|---|---|---|---|
| 9,594,286 | B2 * | 3/2017 | Kim | H01L 51/5284 |
| 2002/0080494 | A1 * | 6/2002 | Meine | A47G 1/02 359/630 |
| 2004/0196213 | A1 * | 10/2004 | Tidwell | G02B 27/017 345/8 |
| 2006/0050016 | A1 * | 3/2006 | Tomisawa | G02B 27/2214 345/32 |
| 2006/0098114 | A1 * | 5/2006 | Horii | H04N 5/2254 348/360 |
| 2008/0018641 | A1 * | 1/2008 | Sprague | G02B 27/017 345/419 |
| 2008/0074606 | A1 | 3/2008 | Lee | |
| 2008/0106705 | A1 | 5/2008 | Cortenraad et al. | |
| 2009/0052000 | A1 * | 2/2009 | Sakata | G02B 26/005 359/228 |
| 2009/0295683 | A1 * | 12/2009 | Pugh | G02B 27/0101 345/9 |
| 2010/0271290 | A1 * | 10/2010 | Tomisawa | G02B 27/2214 345/32 |
| 2010/0290104 | A1 * | 11/2010 | Imai | G02F 1/29 359/319 |
| 2011/0075257 | A1 * | 3/2011 | Hua | G02B 27/017 359/464 |
| 2012/0105747 | A1 * | 5/2012 | Biring | G02B 3/14 349/15 |
| 2012/0230704 | A1 * | 9/2012 | Treyer | G02B 3/14 398/182 |
| 2012/0257123 | A1 | 10/2012 | Lee | |
| 2013/0286047 | A1 * | 10/2013 | Katano | G02B 27/0101 345/633 |

* cited by examiner

WHEN OBJECT 1 IS IN FOCUS

WHEN INFORMATION 1 AND 2 ARE IN FOCUS

SMART MIRROR WITH FOCUS CONTROL

CROSS-REFERENCE TO RELATED APPLICATION AND CLAIM OF PRIORITY

The present application is related to and claims the benefit under 35 U.S.C. § 119(a) to Korean Application Serial No. 10-2014-0090998, which was filed in the Korean Intellectual Property Office on Jul. 18, 2014, the entire content of which is hereby incorporated by reference.

TECHNICAL FIELD

Various embodiments of the present disclosure relate to a technology for controlling the focus of an electronic device.

BACKGROUND

Studies have been conducted on a technology (hereinafter, referred to as smart mirror) of combining a mirror and a display to show weather, schedule, or health information when a user is in front of the mirror. The smart mirror is a device into which a one-way mirror, having a characteristic of looking transparent only in one direction, and a display panel are integrated. The smart mirror functions as a mirror when the display panel on the rear surface of the one-way mirror is turned off, and provides a display function, with panel-emitted light passing through the one-way mirror when the display panel is turned on.

SUMMARY

A user, when using a smart mirror, has difficulty in clearly recognizing information displayed through a display and his/her own image in the mirror at the same time due to a difference in the focal length between the information displayed through the display and his/her own image in the mirror.

To address the above-discussed deficiency, it is a primary object to provide a device and method for similarly controlling the focal lengths of an image displayed through a display panel and an object reflected in the mirror in an electronic device (e.g., a smart mirror According to various embodiments, an electronic device includes: a display unit configured to display an image; a reflective layer; and a focus control layer disposed between the display unit and the reflective layer; a processor configured to control a focus of the image displayed on the display unit using the focus control layer.

According to various embodiments, a method for controlling the focus in an electronic device includes: identifying the occurrence of an image display event through a display panel; identifying a location where an image is to be displayed; and controlling the focus of the location, where the image is to be displayed, through a focus control layer.

According to various embodiments, an electronic device for controlling a focus includes: a display panel; a reflective layer; a focus control layer disposed between the display unit and the reflective layer and a processor that identifies the occurrence of an image display event through the display panel, identifies a location where an image is to be displayed, and controls the focus of the location, where the image is to be displayed, through the focus control layer.

According to various embodiments, a computer readable recording medium having instructions stored therein is provided in which a program is recorded for executing an operation of identifying the occurrence of an image display event through a display panel, an operation of identifying a location where an image is to be displayed, and an operation of controlling the focus of the location, where the image is to be displayed through a focus control layer.

According to various embodiments, an electronic device for controlling a focus includes: a display unit configured to display a plurality images; an eye tracking sensor configured to detect a eye-focused area on the display unit; a reflective layer; a reflective control layer configured to change a regional reflectivity of the reflective layer; and a processor configured to receive the eye-focused area on the display unit from the eye tracking sensor; determine a focus image within the eye-focused area and an unfocused image out of the eye-focused area; and cause the reflective control layer to reflect the unfocused image.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
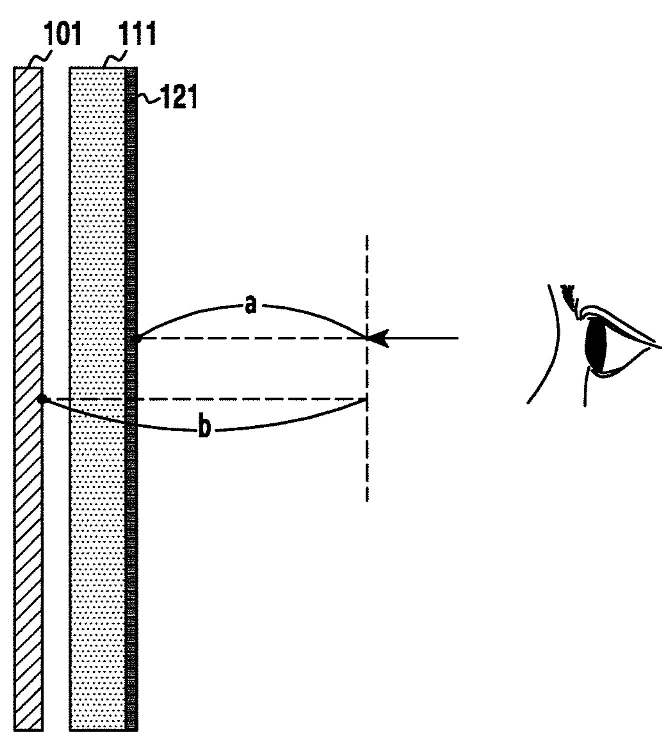
FIGS. 1A-1C illustrate focal lengths when an electronic device provides a smart mirror function, according to various embodiments of present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure, in describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may he named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation, The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

The module or programming module according to various embodiments of the present disclosure may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device including a smart mirror function. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance including a smart mirror function. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a. gyrocompass); an avionics equipment; a security equipment; a head unit for vehicle; an industrial or home robot; an automatic teller's machine (ATM) of a financial institution, point of sale (POS) device at a retail store, or an Internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter), each of which includes a smart mirror function.

An electronic device according to various embodiments of the present disclosure may also include a combination of one or more of the above-mentioned devices.

Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

Figure 1B:
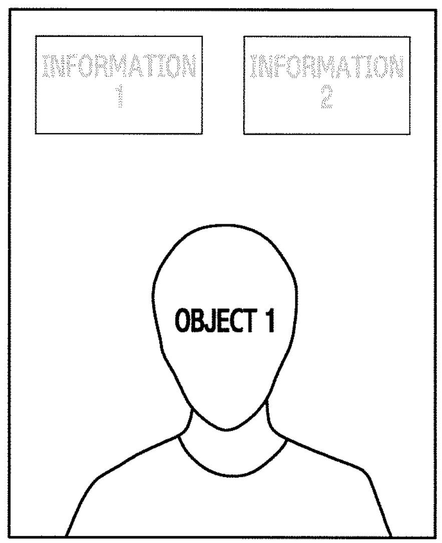

FIGS. 1A and 1B illustrate focal lengths when an electronic device, according to various embodiments of present disclosure, provides a smart mirror function. Herein, the smart mirror functions can be implemented by depositing a thin layer of material that may include a reflection effect on the surface, such as aluminum or chrome on the front display panel.

Referring to FIG. 1A, an object can be reflected in a deposited surface 121 of a one-way mirror that functions as a mirror, in addition, in the case of information displayed on a display panel 101, an image focused on the display panel 101 can be refracted by a glass substrate 111 and the deposited surface 121 thereon.

Figure 1C:
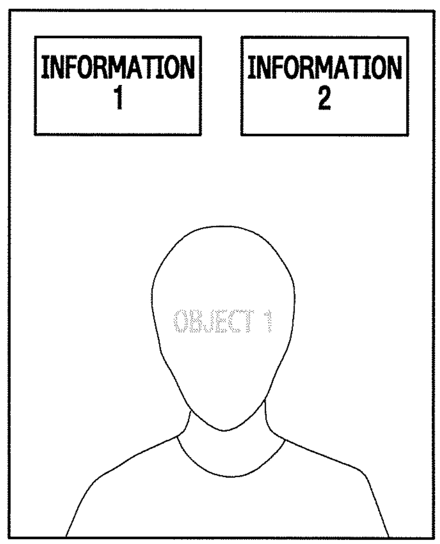

Accordingly, as illustrated in FIG. 1B and 1C, in the electronic device providing the smart mirror function, the focal length 'a' of object 1 reflected on the mirror is different from the focal length 'b' of information 1 and information 2 focused on the display panel 101.

Referring to FIGS. 1B and 1C, when a user focuses his/her eyes on object 1 as illustrated in FIG. 1B, the user cannot recognize information 1 and information 2 due to the different focal length. When the user focuses his/her eyes on information 1 or information 2 as illustrated in FIG. 1C, the user cannot recognize object 1 due to the focal length therebetween.

Figure 2:
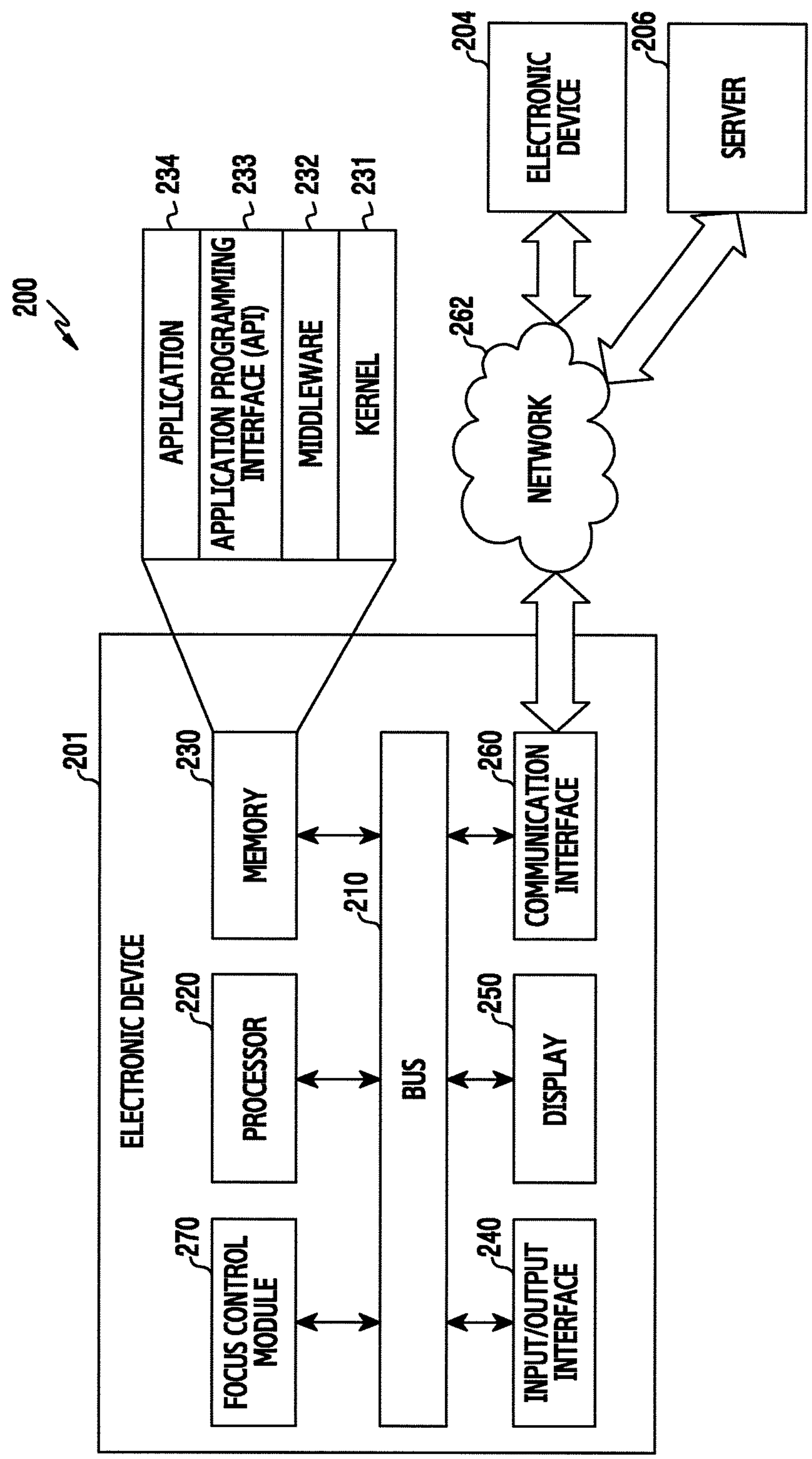
FIG. 2 illustrates a network environment including an electronic device according to various embodiments of the present disclosure.

FIG. 2 illustrates a network environment 200, including an electronic device 201, according to various embodiments. For example, the electronic device 201 can provide a smart mirror function.

Referring to FIG. 2, the electronic device 201 can include a bus 210, a processor 220, a memory 230, an input/output interface 240, a display 250, a communication interface 260, and a focus control module 270.

The bus 210 can include a circuit for connecting the aforementioned constituent elements with one another, and forwarding communication (e.g., a control message) between the aforementioned constituent elements.

The processor 220 can include one or more of a Central Processing Unit (CPU), an Application Processor (AP), or a Communication Processor (CP). The processor 220 can, for example, execute an operation or data processing for control and/or communication of at least one other constituent element of the electronic device 201.

The memory 230 can include a volatile and/or non-volatile memory. The memory 230 can store an instruction or data related to at least one other constituent element of the electronic device 201. As illustrated in FIG. 2, the memory 230 includes a kernel 231, a middleware 232, an Application Programming Interface (API) 233, and an application program 234. At least some of the kernel 231, the middleware 232, or the API 233 can commonly be referred to as an Operating System (OS).

The kernel 231 can control or manage system resources (e.g., the bus 210, the processor 220, the memory 230, etc.) used for executing operations or functions implemented in other programs (e.g., the middleware 232, the API 233, or the application program 234). The kernel 231 can provide an interface for the middleware 232, the API 233, or the application program 234 to access the individual constituent element of the electronic device 201, thereby being capable of controlling or managing the system resources.

The middleware 232 can perform a relay role for the API 233 or the application program 234 to communicate with the kernel 231 and exchange data with the kernel 231. The middleware 232 can perform control over a work request received from the application program 234. For example, the middleware 232 can control (e.g., scheduling or load balancing) the work request by allotting one of application programs 234 capable of using the system resources of the electronic device 201.

The API 233 can include an interface or a function (e.g., an instruction) for the application program 234 to control a function of the kernel 231 or the middleware 232. For example, the API 233 can include at least one interface, such as file control, window control, image processing, or character control.

For example, the application 234 can include an information exchange application that supports information exchange between the electronic device (e.g., the electronic device 201) and an external electronic device (e.g. the electronic device 204). The information exchange application can, for example, include a notification relay application for relaying specific information to the external electronic device or a device management application for managing the external electronic device.

For example, the notification relay application can include a function of relaying, to the external electronic device, notification information generated in other applications (e.g., an SMS/MMS application, an e-mail application, a health care application, an environment information application, etc.) of the electronic device. Also, the notification relay application can receive notification information from the external electronic device and provide the received notification information to a user.

For example, the device management application can manage (e.g., install, delete, or update) a function (e.g., turn-on/turn-off of the external electronic device itself (or some constituent components), or adjustment of a brightness (or resolution) of a display) of the external electronic device communicating with the electronic device, an application operating in the external electronic device, or a service (e.g., a telephony service or a message service) provided in the external electronic device.

The application 234 can include an application (e.g., the health care application designated according to an attribute of the external electronic device. For example, the application 234 can include a health care application, when the electronic device is a mobile medical device, The application 234 can include an application received from the external electronic device (e.g., the server or the electronic device).

The application 234 can include a preloaded application or a third party application downloadable from the server. The names of the constituent elements of the program module according to the illustrated exemplary embodiment can be different according to the kind of an operating system.

At least a portion of the program module can be implemented by software, firmware, hardware, or a combination thereof. The portion of the program module can be, for example, implemented (e.g., executed) by a processor (e.g., an application program). The portion of the program module can include, for example, a module, a program, a routine, sets of instructions, or a process for performing one or more functions.

The input/output interface 240 can perform a role of an interface capable of forwarding an instruction or data inputted from a user or other external devices, to the other constituent elements of the electronic device 201, and can output an instruction or data received from the other constituent elements of the electronic device 201, to the user or other external devices.

The display 250 can display various types of information (e.g., multimedia data or text data) to a user. The display 250 can include a display panel, such as a Liquid Crystal Display (LCD), a Plasma Display Panel (PDP), or an Organic Light Emitting Diode ("OLE"), which has a plurality of pixels configured in an array form, and a Display Driver IC (DDI) for driving the display panel. The display 250 can be the same overall size as a one-way mirror or a half mirror, or can be implemented to be smaller than the one-way mirror or the half mirror. The display 250 can be constituted by one or more displays. In addition, the display 250 can provide a partial display function of activating only a particular pixel area.

The communication interface 260 can connect communication between the electronic device 201 and an external device (e.g., the electronic device 204 or the server 206). For example, the communication interface 260 can communicate with the external device while being connected to a network 262 through wireless or wired communication. The wireless communication can include at least one of, for example, Wireless Fidelity (Wi-Fi), Bluetooth (BT), Near Field Communication (NFC), a Global Positioning System (GPS), and cellular communication (e.g., Long Term Evolution (LTE), Long Term Evolution-Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM)). The wired communication can include at least one of, for example, a Universal Serial Bus (USB), a High Definition Multimedia Interface (HDMI), Recommended Standard 232 (RS-232), and a Plain Old Telephone Service (POTS).

According to an embodiment, the network 262 can be a telecommunication network. The communication network can include at least one of a computer network, the Internet, the Internet of things, and a telephone network. According to an embodiment, a protocol (e.g., transport lay protocol, data link layer protocol, or a physical layer protocol) for communication between the electronic device 201 and the external device can be supported by at least one of the applications 234, the application programming interface 233, the middleware 232, the kernel 231, and the communication interface 260.

According to an embodiment, the server 206 can perform at least one of the operations (or functions) implemented in the electronic device 201 to support the driving of the electronic device 201.

The focus control module 270 can process at least a part of the information acquired from the other elements (e.g., the processor 220, the memory 230, the input/output interface 240, and the communication interface 260) and provide the processed information to the user in various manners. For example, the focus control module 270 can control a focus control layer to change the focal length of an image displayed on the display 250. According to an embodiment, at least one element of the focus control module 270 can be included in the server 206 and supported by the server 206 for at least one operation implemented in the focus control module 270. Additional information on the focus control module 270 will be provided through FIG. 3 to be described below.

Figure 3:
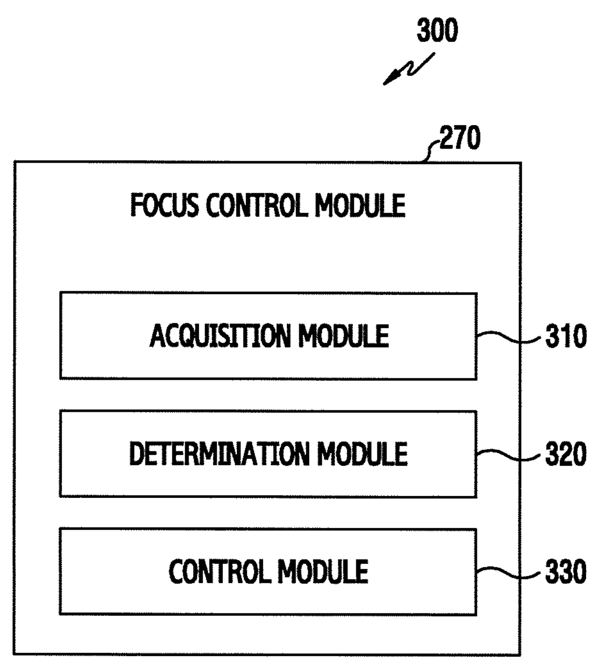
FIG. 3 is a block diagram of a focus control module of an electronic device according to various embodiments of the present disclosure.

FIG. 3 is a block diagram 300 of a focus control module 270 of an electronic device (e.g., the electronic device 201), according to various embodiments of the present disclosure.

Referring to FIG. 3, the focus control module 270 can include an acquisition module 310, a determination module 320, and a control module 330.

The acquisition module 310, when an image display event occurs, can acquire the coordinates of a location where an image is to be displayed through a display panel. According to an embodiment, the acquisition module 310 can acquire the coordinates of a location where an image is to be displayed in at least a partial area within the entire area of the display panel. According to an embodiment, the acquisition module 310 can acquire the coordinates of at least one lens included in a focus control layer, which correspond to the coordinates of the location where the image is to be displayed.

The determination module 320 can receive the coordinates of the location, where the image is to be displayed, from the acquisition module 310 and determine a voltage to be applied to at least one lens of the focus control layer corresponding to the relevant coordinates. According to an embodiment, the at least one lens can have an index of refraction that varies in multiple stages with the applied voltage. According to an embodiment, the determination module 320 can determine a voltage to be applied to at least one lens of the focus control layer based on a focal length of an object reflected on a reflective layer (or reflective panel). The electronic device can detect the focal length of the object reflected on a reflective layer using at least one of camera, infrared sensor, or ultrasonic sensor.

The control module 330 can apply a voltage to the corresponding lens included in the focus control layer on the basis of the voltage determined through the determination module 320. According to an embodiment, the refractive index of the lens to which voltage is applied can vary with the voltage value.

Figure 4:
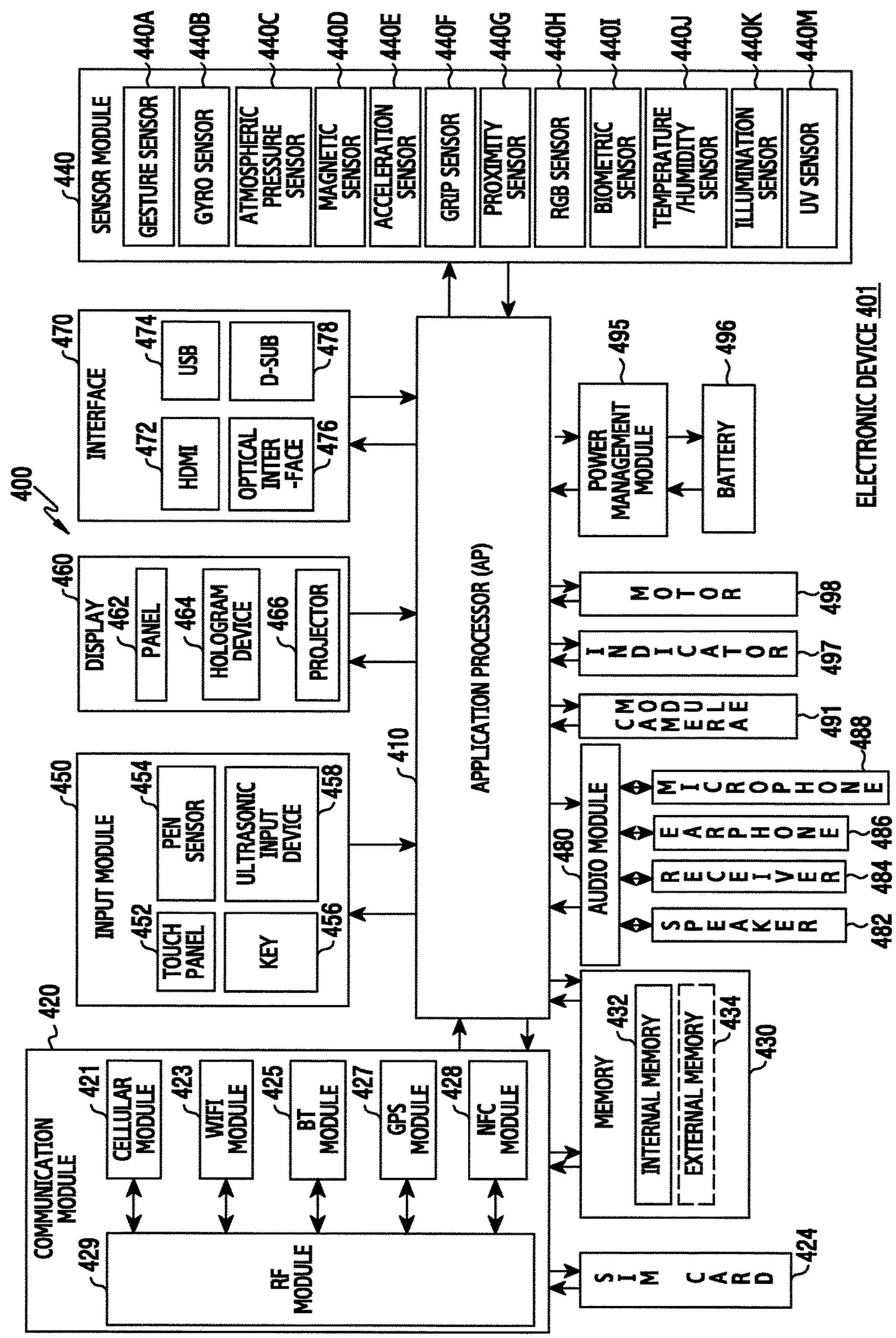
FIG. 4 is a block diagram of an electronic device according to various embodiments of the present disclosure.

FIG. 4 is a block diagram 400 of an electronic device 401 according to various embodiments of the present disclosure.

The electronic device 401 can constitute, for example, all or a part of the electronic device 201 illustrated in FIG. 2.

Referring to FIG. 4, the electronic device 401 can include one or more APs 410, a communication module 420, a Subscriber Identification Module (SIM) card 424, a memory 430, a sensor module 440, an input device 450, a display 460, an interface 470, an audio module 480, an image sensor module 491, a power management module 495, a battery 496, an indicator 497, or a motor 498.

The AP 410 can drive an OS or application program and control a plurality of hardware or software constituent elements connected to the AP 410. The API 410 can also process various kinds of data including multimedia data, or perform an operation. For example, the AP 410 can be implemented as a SoC.

Although not illustrated, the AP 410 can also include a Graphic Processing Unit (GPU).

The communication module 420 (e.g., the communication interface 260) cart perform data transmission and reception in communication between the electronic device 401 (e.g., electronic device 201) and other electronic devices (e.g., the electronic device 204 or server 206) connected through a network. In FIG. 4, the communication module 420 can include a cellular module 421, a WiFi module 423, a BT module 425, a GPS module 427, an NFC module 428, or RF module 429.

The cellular module 421 can provide voice telephony, video telephony, a text service, an Internet service, etc., through a communication network (e.g., LTE, LTE-A, CDMA, WCDMA, UMTS, WiBro, or GSM). Also, the cellular module 421 can identify or authenticate an electronic device within a communication network using a subscriber identification module (e.g., the SIM card 424). Further, the cellular module 421 can perform at least some of functions capable of being provided by the AP 410. For example, the cellular module 421 can perform at least a portion of a multimedia control function.

Although not illustrated, the cellular module 421 can include a Communication Processor (CP). The cellular module 421 can also be implemented as an SoC.

In FIG. 4, although the constituent elements, such as the cellular module 421 (e.g., the communication processor), the memory 430, and the power management module 495 are illustrated as being separate from the AP 410, the AP 410 can be implemented to include at least some (e.g., the cellular module 421) of the functionality of the aforementioned constituent elements.

The AP 410 or the cellular module 421 (e.g., the communication processor) can load, to a volatile memory, an instruction or data received from a non-volatile memory connected to each of the AP 410 and the cellular module 421 or at least one of the other constituent elements, and process the loaded instruction or data. The AP 410 or the cellular module 421 can also store, in the non-volatile memory, data received from at least one of the other constituent elements or generated by at least one of the other constituent elements.

Although not illustrated in FIG. 4, each of the WiFi module 423, the BT module 425, the GPS module 427 or the NFC module 428 can include a processor for processing data transmitted/received through the corresponding module.

Further, although the cellular module 421, the WiFi module 423, the BT module 425, the GPS module 427, or the NFC module 428 is illustrated as separate blocks, at least some (e.g., two or more) of the cellular module 421, the WiFi module 423, the BT module 425, the GPS module 427, or the NFC module 428 can be included within one IC or IC package. For example, at least some (e.g., the communication processor corresponding to the cellular module 421 and a WiFi processor corresponding to the WiFi module 423) of the processors each corresponding to the cellular module 421, the WiFi module 423, the BT module 425, the UPS module 427, or the NFC, module 428 can he implemented as one SoC.

The RF module 429 can perform transmission and reception of data using an RF signal. Although not illustrated, the RF module 429 can include a transceiver, a PAM, a frequency filter, and an LNA. The RF module 429 can also include a component (for example, a conductor, a conducting wire, etc.) for transmitting and receiving electromagnetic waves on free space in wireless communication.

Although the cellular module 421, the WiFi module 423, the BT module 425, the GPS module 427, and the NFC module 428 share one RF module 429 in FIG. 4, the present disclosure is not limited thereto, and at least one of the cellular module 421, the WiFi module 423, the BT module 425, the GPS module 427, or the NFC module 428 can perform transmission and reception through a separate RF module.

The RF module 429 can include at least one antenna among a main antenna and a sub antenna operatively connected with the electronic device 401. For example, the communication module 420 can support MIMO using the main antenna and the sub antenna.

The SIM card 424 can be a card including a subscriber identification module, and can be inserted into a slot provided in the electronic device. The SIM card 424 can include unique identification information (e.g., Integrated Circuit Card ID (ICCID)) or subscriber information (e.g., an International Mobile Subscriber Identity (IMSI)).

The memory 430 includes an internal memory 432 or an external memory 434. For example, the internal memory 432 can include at least one of a volatile memory (e.g., a DRAM, an SRAM, an SDRAM and the like) or a non-volatile memory (e.g., an OTPROM, a PROM, an EPROM, an EEPROM, a mask ROM, a flash ROM, a NAND flash memory, a NOR flash memory and the like).

For example, the internal memory 432 can be a Solid State Drive (SSD), and the external memory 434 can include a flash drive, such as a CF, an SD, a Micro-SD, a Mini-SD, an xD, or a memory stick. The external memory 434 can be operatively connected with the electronic device 401 through various interfaces. For example, the electronic device 401 can further include a storage device (or a storage medium) such as a hard drive.

The sensor module 440 can meter a physical quantity or detect an activation state of the electronic device 401, and convert metered or detected information into an electrical signal. The sensor module 440 can include at least one of a gesture sensor 440A, a gyro sensor 440B, an air pressure sensor 440C, a magnetic sensor 440D, an acceleration sensor 440E, a grip sensor 440F, a proximity sensor 440G, a color sensor 440H (e.g., a Red Green Blue (RGB) sensor), a bio-physical sensor 440I, a temperature/humidity sensor 440J, an illumination sensor 440K, and a Ultraviolet (UV) sensor 440M. Although not illustrated, the sensor module 440 can additionally or alternatively include an Electronic nose (E-nose) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor module 440 can further include a control circuit for controlling at least one of the sensors included therein.

The input device 450 can include a touch panel 452, a (digital) pen sensor 454, a key 456, or an ultrasonic input device 458. The touch panel 452 can recognize, for example, a touch input in at least one scheme among a capacitive scheme, a pressure sensitive scheme, an infrared scheme, or an ultrasonic scheme. The touch panel 452 can also include a control circuit. In the capacitive scheme, physical touch or proximity recognition is possible.

The touch panel 452 can also include a tactile layer, such that the touch panel 452 can provide a tactile response to a user.

The (digital) pen sensor 454 can be implemented using the same or similar method to receiving a user's touch input or a separate recognizing sheet.

The key 456 can include a physical button, an optical key, or a keypad.

The ultrasonic input device 458 identifies data by sensing a sound wave with a microphone in the electronic device 401 through an input tool generating an ultrasonic signal, and can perform wireless recognition.

Further, the electronic device 401 can receive a user input from an external device (e.g., a computer or a server) connected to the electronic device 401 using the communication module 420.

The display 460 (e.g., the display 260) can include a panel 462, a hologram 464, or a projector 466. For example, the panel 462 can include an LCD, an AMOLED, etc. The panel 462 can also be implemented to be flexible, transparent, or wearable.

The panel 462 can be also constructed as one module together with the touch panel 452.

The hologram 464 can show a three-dimensional image in the air by using interference of light.

The projector 466 can display an image by projecting light to a screen, which can be located inside or outside of the electronic device 401. Although not illustrated, the display 460 can further include a control circuit for controlling the panel 462, the hologram 464, or the projector 466.

The interface 470 can include an HDMI 472, a USB 474, an optical interface 476, or a D-subminiature (D-sub) 478. Although not illustrated, the interface 470 can additionally or alternatively include a Mobile High-definition Link (MHL) interface, a Secure Digital (SD) card/Multi Media Card (MMC) interface, and/or an Infrared Data Association (IrDA) standard interface.

The audio module 480 can convert a sound and an electric signal interactively. For example, the audio module 480 can process sound information that is inputted or outputted through a speaker 482, a receiver 484, an earphone 486, and a microphone 488.

The image sensor module 491 captures still and moving pictures. For example, the image sensor module 491 can include one or more image sensors (e.g., front sensor or rear sensor), a lens, an Image Signal Processor (ISP), and a flash (e.g., an LED or a xenon lamp).

The power management module 495 can manage electric power of the electronic device 401. Although not illustrated, the power management module 495 can include a PMIC, a charger IC, or a battery or fuel gauge.

The PMIC can be mounted, for example, within an integrated circuit or an SoC semiconductor. A charging scheme can be divided into a wired charging scheme and a wireless charging scheme. The charger IC can charge a battery, and can prevent the inflow of overvoltage or overcurrent from an electric charger. The charger IC can include a charger IC for at least one of the wired charging scheme or the wireless charging scheme. Examples of the wireless charging schemes include a magnetic resonance scheme, a magnetic induction scheme, and an electromagnetic wave scheme. Supplementary circuits for wireless charging, such as a coil loop, a resonance circuit, a rectifier, etc., can also be added.

The battery gauge can measure a level of the battery 496, a voltage during charging, an electric current, and/or a temperature. The battery 496 can store or generate electricity, and can supply a power source to the electronic device 401 using the stored or generated electricity. For example, the battery 496 can include a rechargeable battery or a solar battery.

The indicator 497 can indicate a specific state of the electronic device 401 or a component (e.g., the AP 410) thereof, for example, a booting state, a message state, a charging state, etc.

The motor 498 can convert an electric signal into a mechanical vibration.

Although not illustrated, the electronic device 401 can also include a processing device (e.g., a GPU) for mobile TV support, which processes standard media data of Digital Multimedia Broadcasting (DMB), Digital Video Broadcasting (DVB), a media flow, etc.

Each of the aforementioned constituent elements of the electronic device of the above-described embodiments of the present disclosure can include one or more components, and a name of the corresponding constituent elements can be different according to the kind of the electronic device. Further, the electronic devices can include at least one of the aforementioned constituent elements, and can omit some constituent elements or further include additional other constituent elements. Also, some of the constituent elements of the electronic devices of the above-described embodiments can be combined and constructed as one entity, while still being able to identically perform the functions of the corresponding constituent elements before combination.

According to various embodiments, an electronic device includes a display unit configured to display an image; a reflective layer; a focus control layer disposed between the display unit and the reflective layer; a processor configured to control a focus of the image displayed on the display unit using the focus control layer.

According to various embodiments, the focus control layer comprises a lens array including a plurality of lenses.

According to various embodiments, each lens is configured to determine a regional reflectivity of the reflective layer.

According to various embodiments, the respective refractive indices of the lenses vary according to respective applied voltages in real time.

According to various embodiments, each lens included in the lens array corresponds to each pixel included in a pixel array of the display unit.

According to various embodiments, each lens included in the lens array corresponds to a plurality of pixels included in a pixel array of the display unit.

According to various embodiments, an electronic device includes a display panel; a reflective layer; a focus control layer disposed between the display unit and the reflective layer; and a processor that identifies occurrence of an image display event through the display panel, identifies a location where an image is to be displayed, and controls the focus of the location, where the image is to be displayed, through the focus control layer.

According to various embodiments, the processor controls the focus of the image displayed through the display panel by changing the refractive indices of lenses corresponding to the location where the image is to be displayed, among lenses included in a micro lens array included in the focus control layer.

According to various embodiments, the processor controls the focus of the image displayed through the display panel by applying a voltage to the lenses corresponding to the location where the image is to be displayed.

According to various embodiments, the processor identifies whether the location where the image is to be displayed is included in an important display area, and makes a control to make the refractive indices of lenses corresponding to the important display area different from those of lenses corresponding to an area other than the important display area when the location is included in the important display area.

Figure 5:
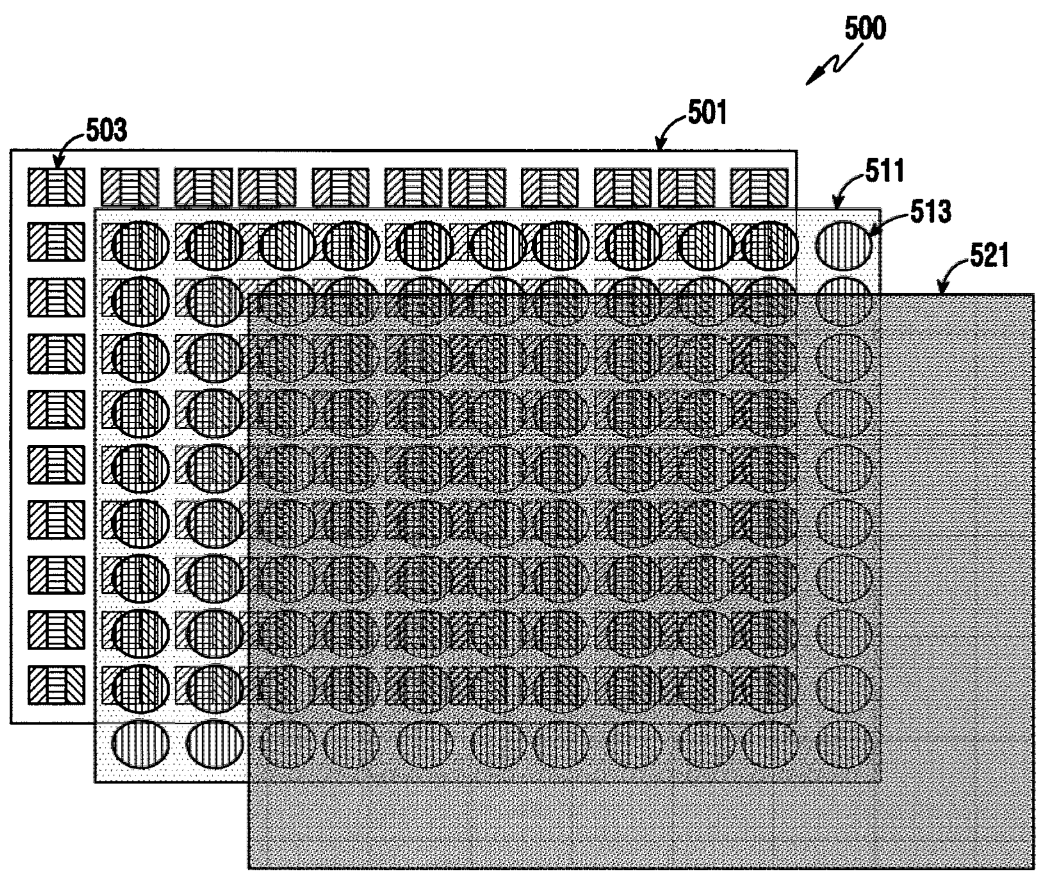
FIG. 5 illustrates an electronic device including a focus control layer according to various embodiments of the present disclosure.

FIG. 5 illustrates an electronic device 500 including a focus control layer 511 according to various embodiments. Hereinafter, a configuration for changing the focal length of an image, displayed on a display panel 501 will be described on the basis of the refractive index change of a lens illustrated in FIG. 6.

The electronic device 500 (e.g., the electronic device 201 or 401) performing a smart mirror function, according to the various embodiments, may operate as follows. According to an embodiment, the electronic device 500 may include the display panel 501 having a material, such as aluminum or chrome, thinly coated on the front surface thereof, which can provide a reflective effect to the surface.

According to an embodiment, the electronic device 500 may operate in a mirror mode in which the display panel 501 is powered off or has a lower brightness than the surroundings so that a user can identify only an image reflected on a reflective layer 521.

According to an embodiment, the electronic device 500 may operate in a display mode in which the display panel 501 is supplied with electric power to have a higher brightness than the surroundings so that a user can identify an image displayed through the display panel 501 better than the image reflected in the reflective layer 521.

According to an embodiment, the electronic device 500 may operate in a partial display mode that is complexly configured with the mirror mode and the display mode.

In some embodiments, an electronic device includes a display unit configured to display a plurality images, an eye tracking sensor configured to detect a eye-focused area on the display unit, a reflective layer, a reflective control layer configured to change a regional reflectivity of the reflective layer, and a processor configured to receive the eye-focused area on the display unit from the eye tracking sensor, and determine a focus image within the eye-focused area and an unfocused image out of the eye-focused area, and cause the reflective control layer to reflect the unfocused image.

In some embodiment, the processor is configured to cause the reflective control layer not to reflect the focused image.

Referring to FIG. 5, the electronic device 500 may include a micro lens array 511 that is a focus control layer, between the reflective layer (glass) 521 and the display panel 501. In the various embodiments of the present disclosure, the micro lens array 511 is illustrated as an example of the focus control layer. However, the focus control layer, without being limited thereto, may include any one device that may be disposed between the reflective layer 521 and the display panel 501 to change the focal length of an image displayed on the display panel 501.

The micro lens array 511 includes a plurality of lenses and can change the focal length of the image displayed on the display panel 501 since the refractive indices of lenses vary in real time according to a particular condition. According to an embodiment, the electronic device 500 may change the respective refractive index of a plurality of lenses, included in the micro lens array 511, in real time based on a particular condition such as a voltage applied to the corresponding lens or whether to display an image.

Figures 6A, 6B, 6C:
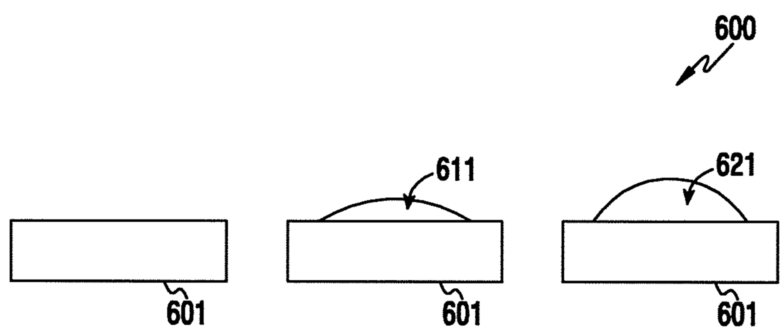
FIGS. 6A to 6C illustrate example stepwise refractive index changes of a lens included in the focus control layer according to various embodiments of the present disclosure.

FIGS. 6A to 6C illustrate how respective lenses of the micro lens array have different refractive indices according to embodiments of the present disclosure. The respective voltage is applied to each lens of the micro lens array is Based on the voltage applied to the corresponding lens 513, the electronic device 500 may change the refractive index of the lens to a fundamental refractive index (FIG. 6A), a first refractive index (FIG. 6B)), or a second refractive index (FIG. 6C). For example, referring to FIG. 6A, the electronic device 500 may provide the fundamental refractive index on the basis of a voltage applied to a lens 601 of a focus control layer 600. Referring to FIG. 6B, the electronic device 500 may transform the lens 601 as indicated by reference numeral 611 based on the voltage applied to the lens 601 of the focus control layer 600, thereby providing the first refractive index. Referring to FIG. 6C, the electronic device 500 may transform the lens 601 as indicated by reference numeral 621 based on the voltage applied to the lens 601 of the focus control layer 600, thereby providing the second refractive index.

According to various embodiments, at least one lens 513 included in the micro lens array 511 may correspond to at least one pixel 503 included in the display panel 501. According to an embodiment, any one lens 513 included in the micro lens array 511 may correspond to any one pixel 503 included in the display panel 501. According to an embodiment, any one lens 513 included in the micro lens array 511 may correspond to a plurality of pixels 503 included in the display panel 501. According to an embodiment, a plurality of lens 513 included in the micro lens array 511 may correspond to any one pixel 503 included in the display panel 501.

Figure 7:
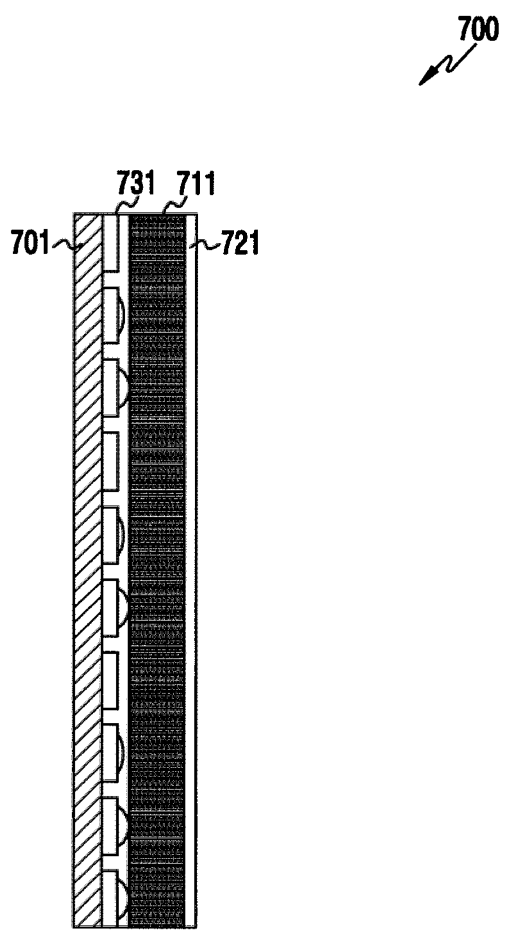
FIG. 7 is a side view in a cross-section of an electronic device including a focus control layer according to various embodiments of the present disclosure.

FIG. 7 is a side view of an electronic device 700 including a focus control layer 731, according to various embodiments.

Referring to FIG. 7, the electronic device 700 (e.g., the electronic device 201 or 401) may include a micro lens array 731, which is a focus control layer, between a reflective layer (glass) 711 and a display panel 701. According to an embodiment, the electronic device 700 may be implemented by thinly depositing a material 721, such as aluminum or chrome, on the front surface of the display panel 701, wherein the material 721 can provide a reflective effect to the surface.

The micro lens array 731 may change the focal length of an image displayed on the display panel 701 since the refractive index thereof varies in real time with a particular condition. According to an embodiment, the electronic device 700 may change the refractive index of at least one lens, included in the micro lens array 731, in real time based on a particular condition such as a voltage applied to the corresponding lens or whether to display an image.

According to various embodiments, the at least one lens included in the micro lens array 731 may correspond to at least one pixel included in the display panel 701.

Figure 8:
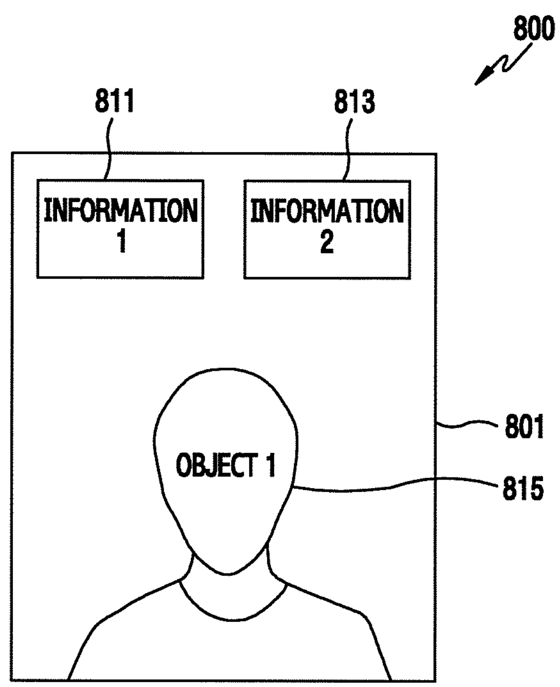
FIG. 8 illustrates a screen where three images displayed on a smart mirror, and an image reflected in the smart mirror are determined by controlling the focus of an image displayed through a display in an electronic device according to various embodiments of the present disclosure.
Figure 9:
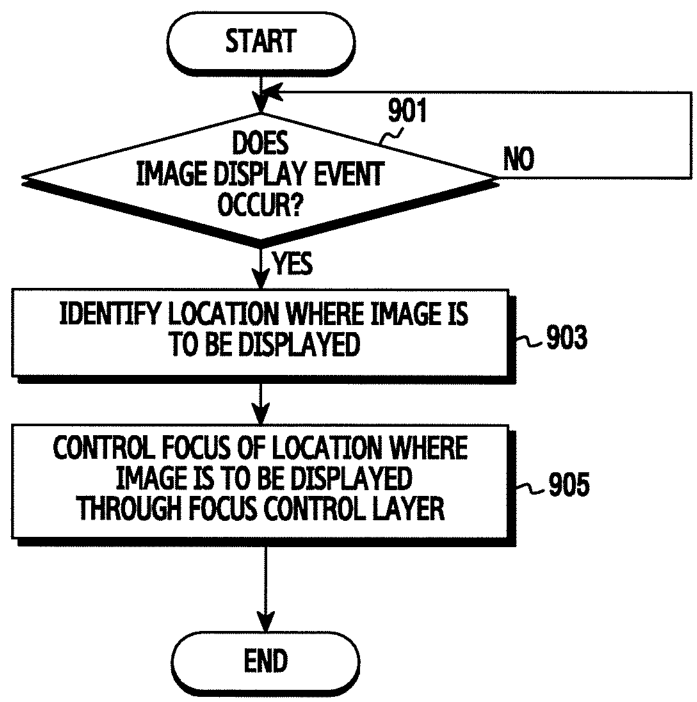
FIG. 9 is a flowchart illustrating a procedure of controlling a focus of an image in an electronic device, according to various embodiments of the present disclosure.

FIG. 9 is a flowchart illustrating a procedure of controlling a focus in an electronic device, according to various embodiments of the present disclosure. Hereinafter, an operation of controlling a focus using a screen of a smart mirror illustrated in FIG. 8 will be described.

Referring to FIG. 9, in step 901, the electronic device (e.g., the electronic device 201 or 401) may identify whether an image display event occurs. According to an embodiment, the electronic device performs a smart mirror function and may include a micro lens array, which is a focus control layer, between a reflective layer and a display panel. According to an embodiment, the electronic device may identify whether an image display event occurs on the display panel.

In step 903, the electronic device may identify a location where an image is to be displayed. According to an embodiment, as illustrated in FIG. 8, the electronic device 800 may identify the coordinates of a location where an image is to be displayed in the entire area 801 of the display panel. According to an embodiment, the electronic device 800 may identify the coordinates of a location where an image is to be displayed in a partial area within the entire area 801 of the display panel.

In step 905, the electronic device may control the focus of the location where the image is to be displayed through the focus control layer. According to an embodiment, as illustrated in FIG. 8, the location where the image is to be displayed may be the entire area 801 of the display panel. According to an embodiment, the location where the image is to be displayed may be at least a partial area (at least one of areas 811 and 813) within the entire area 801 of the display panel.

According to an embodiment, in cases where the image display event occurs over the entire area 801 of the display panel, the electronic device 800 may make a control to apply a voltage to all lenses included in the focus control layer. At this time, the electronic device 800 may control the level of the applied voltage to change the refractive indices of the lenses in multiple stages.

According to an embodiment, in cases where the image display event occurs over the partial area 811 or 813 within the entire area 801 of the display panel, the electronic device 800 may make a control to apply a voltage to the lenses corresponding to the partial area 811 or 813 of the display panel among all the lenses included in the focus control layer. At this time, the electronic device 800 may control the level of the applied voltage to change the refractive indices of the lenses in multiple stages.

Accordingly, the electronic device 800 may make a control such that the focal length of the image displayed on the display panel is shortened by the lenses included in the focus control layer. That is, as illustrated in FIG. 8, an electronic device user may make a control such that information 1 (811) and information 2 (813), which are images displayed through the display panel, are located at a similar focal length to object 1 (815) which is an image on the reflective layer.

As described above, the electronic device may control the focus of the location where the image is to be displayed through the focus control layer.

Figure 10:
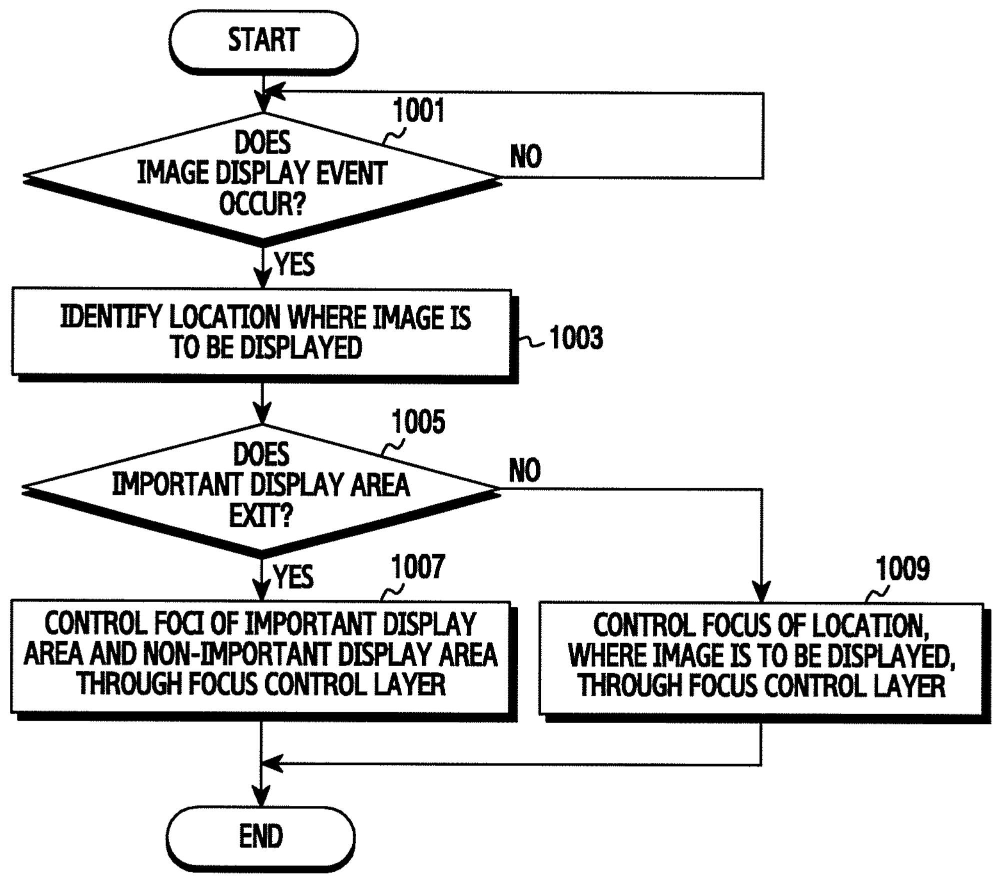
FIG. 10 is a flowchart illustrating a procedure of controlling a focus in an electronic device, according to various embodiments of the present disclosure.

In another embodiment, as illustrated in FIG. 10, an electronic device may control the focus of a location, where an image is to be displayed, for each area.

FIG. 10 is a flowchart illustrating a procedure of controlling the focus of a location, where an image is to be displayed, for each area in an electronic device, according to various embodiments.

Referring to FIG. 10, in step 1001, the electronic device (e.g., the electronic device 201 or 401) may identify whether an image display event occurs. According to an embodiment, the electronic device performs a smart mirror function and may include a micro lens array, which is a focus control layer, between a reflective layer and a display panel. According to an embodiment, the electronic device may identify whether an image display event occurs on the display panel.

In step 1003, the electronic device may identify a location where an image is to be displayed. According to an embodiment, as illustrated in FIG. 8, the electronic device 800 may identify the coordinates of a location where an image is to be displayed in the entire area 801 of the display panel. According to an embodiment, the electronic device 800 may identify the coordinates of a location where an image is to be displayed in a partial area within the entire area 801 of the display panel.

In step 1005, the electronic device may identify whether location where the image is to be displayed is included in an important display area. Here, the important display area may be an area set in advance by a system or set by a user. According to an embodiment, in FIG. 8, the important display area may be an area where information 1 (811) or information 2 (813) is displayed.

In step 1007, in cases where the location where the image is to be displayed is included in the important display area, the electronic device may control the foci of the important display area and the non-important display area through the focus control layer. According to an embodiment, the electronic device may make a control to more clearly display the focus of the important display area than that of the non-important display area. According to an embodiment, in cases where the area where information 1 (811) is displayed corresponds to the important display area, the electronic device may make a control to apply a voltage to lenses corresponding to the area where information 1 (811) is displayed. Accordingly, the electronic device 800 may make a control such that the focal length of image 1 (811) displayed on the display panel is shortened by the lenses included in the focus control layer. That is, the electronic device 800 may make a control such that information 1 (811) displayed through the display panel has a shorter focal length from a user than information 2 (813).

In step 1009, in cases where the location where the image is to be displayed is not included in the important display area, the electronic device may control the focus of the location, where the image is to be displayed, through the focus control layer. According to an embodiment, as illustrated in FIG. 8, the location where the image is to be displayed may be the entire area 801 of the display panel. According to an embodiment, the location where the image is to be displayed may be at least a partial are (at least one of areas 811 and 813) within the entire area 801 of the display panel.

According to an embodiment, in cases where the image display event occurs over the entire area of the display panel, the electronic device may make a control to apply a voltage to all the lenses included in the focus control layer. At this time, the electronic device may control the level of the applied voltage to change the refractive indices of the lenses in multiple stages.

According to an embodiment, in cases where the image display event occurs over a partial area within the entire area of the display panel, the electronic device may make a control to apply a voltage to the lenses corresponding to the partial area of the display panel among all the lenses included in the focus control layer. At this time, the electronic device may control the level of the applied voltage to change the refractive indices of the lenses in multiple stages.

Accordingly, the electronic device may make a control such that the focal length of the image displayed on the display panel is shortened by the lenses included in the focus control layer. That is, as illustrated in FIG. 8, the electronic device 800 may make a control such that information 1 (811) and information 2 (813), which are images displayed through the display panel, are located at a similar focal length to object 1 (815), which is an image on the reflective layer.

According to various embodiments, a method for controlling a focus in an electronic device may include: identifying occurrence of an image display event through a display panel; identifying a location where an image is to be displayed; and controlling the focus of the location, where the image is to be displayed, through a focus control layer.

According to various embodiments, the controlling of the focus may include controlling the focus of the image displayed through the display unit by changing the refractive indices of lenses corresponding to the location where the image is to be displayed, among lenses included in a micro lens array included in the focus control layer.

According to various embodiments, the controlling of the focus may further include controlling the focus of the image displayed through the display unit by applying a voltage to the lenses corresponding to the location where the image is to be displayed.

According to various embodiments, the method may further include: identifying whether the location where the image is to be displayed is included in an important display area; and making a control to make the refractive indices of lenses corresponding to the important display area different from those of lenses corresponding to an area other than the important display area when the location is included in the important display area.

In the various embodiments of the present disclosure described above, the focal lengths of an image displayed through the display of the smart mirror and an image reflected in the mirror are controlled to be similar to each other, thereby making it possible for a user to easily recognize the image displayed through the display and the image reflected in the mirror.

Additionally, in the various embodiments of the present disclosure, a device, such as a camera, which can sense the locations of a user's eyes, may be further included in order to provide different refractive indices for the user's left and right eyes, thereby providing, to the user, a three-dimensional effect for an image displayed through the display panel.

In the various embodiments of the present disclosure, the focal lengths of an image displayed through the display of the smart mirror and an image reflected in the mirror are controlled to be similar to each other, thereby making it possible for a user to easily recognize the image displayed through the display and the image reflected in the mirror.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least a part of a device (for example, modules or functions thereof) or a method (for example, operations) according to the various embodiments of the present disclosure may be embodied by, for example, a command stored in a computer readable storage medium in a form of a programming module. When the instruction is performed by at least one processor (for example, the processor 220), the at least one processor may perform a function corresponding to the instruction. The computer-readable storage medium may be, for example, the memory 230. At least some of the programming modules may be implemented (for example, executed) by, for example, the processor 220. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a computer readable recording medium having instructions stored therein may include a computer readable recording medium having a program recorded therein for executing an operation of identifying occurrence of an image display event through a display panel, an operation of identifying a location where an image is to be displayed, and an operation of controlling the focus of the location, where the image is to be displayed, through a focus control layer.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:

a display panel;

a reflective layer;

a focus control layer, interposed between the display panel and the reflective layer, comprising a lens array including a plurality of lenses; and a processor configured to:

determine a first area where an image is to be displayed;

identify whether the first area where the image is to be displayed is included in a designated display area, wherein information displayed within the designated display area is highlighted relative to information displayed within an area other than the designated display area;

in response to identifying that the first area is included in the designated display area, change refractive indices of lenses corresponding to the first area included in the designated display area among the plurality of lenses, based on a voltage identified based on a focal length of an object reflected on the reflective layer, wherein a focus of the first area included in the designated display area is different from a focus of a second area other than the first area; and display, based on a focus identified based on the changed refractive indices, the image within the first area.

2. The electronic device of claim 1, wherein respective refractive indices of the plurality of lenses of the lens array vary based on respective applied voltages.

3. The electronic device of claim 1, wherein each lens included in the lens array corresponds to each pixel included in a pixel array of the display.

4. The electronic device of claim 1, wherein each lens included in the lens array corresponds to a plurality of pixels included in a pixel array of the display.

5. A method in an electronic device, comprising:

determining a first area where an image is to be displayed;

identifying whether the first area where the image is to be displayed is included in a designated display area, wherein information displayed within the designated display area is highlighted relative to information displayed within an area other than the designated display area;

in response to identifying that the first area is included in the designated display area, changing refractive indices of lenses corresponding to the first area included in the designated display area among a plurality of lenses that are included in a lens array, based on a voltage identified based on a focal length of an object reflected on a reflective layer, wherein the lens array is included in a focus control layer interposed between a display panel of the electronic device and the reflective layer of the electronic device, and wherein a focus of the first area included in the designated display area is different from a focus of a second area other than the first area; and display, based on a focus identified based on the changed refractive indices, the image within the first area.

* * * * *